(12) United States Patent
Streib

(10) Patent No.: US 7,043,375 B2
(45) Date of Patent: May 9, 2006

(54) METHOD AND DEVICE FOR ENERGY-SAVING LEAK TESTING OF A FUEL TANK SYSTEM, IN PARTICULAR OF A MOTOR VEHICLE

(75) Inventor: Martin Streib, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/343,655

(22) PCT Filed: Jul. 10, 2001

(86) PCT No.: PCT/DE01/02569

§ 371 (c)(1),
(2), (4) Date: Sep. 9, 2003

(87) PCT Pub. No.: WO02/12704

PCT Pub. Date: Feb. 14, 2002

(65) Prior Publication Data

US 2004/0030487 A1 Feb. 12, 2004

(30) Foreign Application Priority Data

Aug. 3, 2000 (DE) .................................. 10038539

(51) Int. Cl.
*G01M 3/02* (2006.01)

(52) U.S. Cl. ....................................................... 702/51

(58) Field of Classification Search .................. 702/51, 702/91; 701/114; 73/49, 753; 123/520, 123/142; 96/109, 111; 122/156; 340/447
See application file for complete search history.

(56) References Cited

U.S. PATENT DOCUMENTS

| 5,263,462 A | * | 11/1993 | Reddy ......................... 123/520 |
| 5,803,055 A | * | 9/1998 | Goto et al. .................. 123/520 |
| 6,073,487 A | * | 6/2000 | Dawson ...................... 73/118.1 |
| 6,089,081 A | | 7/2000 | Cook et al. |
| 6,530,265 B1 | * | 3/2003 | Dawson et al. ............... 73/49.7 |
| 2001/0002552 A1 | * | 6/2001 | Vinci ........................... 73/753 |
| 2001/0022173 A1 | | 9/2001 | Fabre |

FOREIGN PATENT DOCUMENTS

| DE | 100 13 347 | 10/2001 |
| EP | 0 611 674 | 8/1994 |
| EP | 0 952 332 | 10/1999 |

* cited by examiner

*Primary Examiner*—Michael Nghiem
*Assistant Examiner*—Tung Lau
(74) *Attorney, Agent, or Firm*—Kenyon & Kenyon LLP

(57) ABSTRACT

In order, in a diagnostic unit for leak testing of a tank system of an internal combustion engine, to allow minimization of the energy consumption during a diagnostics test and simultaneously prevent the emission of fuel gases, a sleep/wake-up mechanism is provided. The diagnostic unit enters a sleep mode for a selected time interval after the internal combustion engine is turned off, the diagnostic unit enters a wake-up mode at the end of the first time interval and at least acquires the measurement data necessary for the diagnostics test in the wake-up mode. The diagnostic unit then enters the sleep mode again during the diagnostics period. The diagnostic unit is switched off at the end of the diagnostics period.

20 Claims, 2 Drawing Sheets

METHOD AND DEVICE FOR ENERGY-SAVING LEAK TESTING OF A FUEL TANK SYSTEM, IN PARTICULAR OF A MOTOR VEHICLE

FIELD OF THE INVENTION

The present invention relates to a method and a device for operating a diagnostic unit for leak testing of a tank system of an internal combustion engine, e.g., of a motor vehicle, measurement data necessary for the leak testing being acquired during a diagnostics period after the internal combustion engine is turned off. Furthermore, the present invention relates to a diagnostic unit suitable for performing the method.

BACKGROUND INFORMATION

A method and a diagnostic device for leak testing of a tank system of a motor vehicle is described in U.S. Pat. No. 5,263,462. During a shutoff phase of the motor vehicle, the tank system is sealed off using a solenoid valve and, during a longer diagnostics time, the pressure and temperature characteristics in the tank are detected using a sensor system and transmitted to the control unit.

If a partial vacuum builds up during the diagnostics time while the tank cools off, the air tightness of the tank system is inferred therefrom.

This procedure provides that the control unit must be switched on during the entire diagnostics time. In addition, the solenoid valve must also have power supplied to it continuously during the diagnostics time. This requires a high energy consumption during the shutoff phase, which significantly loads the electrical system of the vehicle. These problems may be counteracted by a higher performance configuration of the vehicle electrical system, which, however, causes higher costs. The diagnostics period may also be reduced, which in turn reduces the reliability of the diagnosis.

In a mechanism, previously disclosed by Siemens and DaimlerChrysler in SAE Toptec 99, Indianapolis, the tank is sealed off from the environment by passive non-return valves, which close without current and, therefore, do not consume any energy in the sealed state. However, if the tank is heated, overpressure builds up in the tank during the shutoff phase which, if there is a leak, results in fuel gas and/or vapor, which contains hydrocarbons, being able to escape from the tank system into the environment. In addition, a detection electronic system must also have current supplied to it continuously during the entire diagnostics time in this case.

Furthermore, German Published Patent Application No. 100 13 347, which is expressly incorporated herein in its entirety by reference thereto (e.g., to FIG. 3 therein and the description), a device for low-emission operation of a fuel tank system is described which includes, among other things, an activated carbon filter for dissipating excess fuel gases, a controller, and, e.g., a currentless bistable solenoid valve, which remains in the closed state and in the open state without current. A current pulse is only necessary for switching between these two states. The controller is electrically connected to a first pressure sensor positioned inside a fuel tank and a second pressure sensor positioned outside the fuel tank. Corresponding temperature sensors are also indicated as alternatives. From the pressure data acquired, the controller evaluates whether a partial vacuum or overpressure is to be expected in the tank after the vehicle is turned off. In the case when the analysis of the pressure data indicates that, after the vehicle is turned off, an overpressure in relation to the ambient pressure is to be expected, the solenoid valve is opened in order to conduct the excess fuel gas into the environment via the activated carbon filter and therefore with low emission. In contrast, in case of an expected partial vacuum, the solenoid valve remains closed, after which the leakage test using the partial vacuum may be performed in accordance with the procedure described in U.S. Pat. No. 5,263,462.

Using this device, the emission problem described above is largely eliminated. In contrast to U.S. Pat. No. 5,263,462, the power consumption of the solenoid valve is additionally avoided. However, the controller must be active for the entire diagnostics time.

SUMMARY

It is an object of the present invention to provide a method and a diagnostic unit, which may allow minimization of the energy consumption during a diagnostics test as described above and simultaneously also prevent the emission of fuel gases to the greatest extent possible.

The present invention provides that, after the internal combustion engine is turned off, the diagnostic unit enters a sleep mode for a selected first time interval; the diagnostic unit enters a wake-up mode at the end of the first time interval and at least acquires the measurement data in the wake-up mode; the diagnostic unit then enters the sleep mode again during the diagnostics period; and the diagnostic unit is switched off completely at the end of the diagnostics period.

The interval operation of the diagnostic unit proposed above, i.e., operation which switches between sleep and wake-up modes, may prevent the diagnostic unit from consuming power during the entire diagnostics period, which would significantly stress the batteries of the vehicle and/or of the tank system during the shutoff or rest phase.

After the internal combustion engine is turned off, the diagnostic unit may thus either first acquire the measurement data within the second time interval and only then go into the sleep mode, or go into the sleep mode directly after shutoff of the internal combustion engine and only acquire the measurement data for the first time at the end of the first time interval.

Via the proposed wake-up mechanism, the diagnostic unit may be reactivated at regular time intervals for a second time interval, i.e., the measurement time period. Following wake-up, the diagnostic unit then reads in the sensor signals necessary for diagnosis, i.e., the internal tank pressure and, if necessary, the external tank pressure, as well as the internal tank temperature and, if necessary, the external tank temperature.

The diagnostic unit subsequently switches off again in order to be woken up again after a further time interval. The length of the time intervals, after which the diagnostic unit is woken up, may either be permanently selected or progressively changeable over time. For example, the time interval may be linearly or non-linearly lengthened, e.g., exponentially, as the shutoff time of the vehicle increases in order to be adjusted to the leakage behavior of an assumed leak, which also follows an exponential rate equation, and therefore to record the measurement data in an appropriately adjusted manner. The procedure described may be repeated until there is a diagnostic result or, alternatively, a diagnostics period may be permanently selected.

The method may be performed by either the diagnostic unit itself or an additional controller which controls the diagnostic unit. The sleep mode may represent an actual switched-off mode, for example, in the case of a non-volatile memory for recording the measurement data. In the case of such a switched-off mode, the diagnostic unit is restarted each time at the end of the first time interval.

An example embodiment of the present invention may be provided in an application in a tank system including a solenoid valve, which opens and closes without current, and including an activated carbon filter (see, for example, German Published Patent Application No. 100 13 347), by manner of which excess fuel gas in the tank system may be conducted to the outside in the case of overpressure. In this example embodiment, in the wake-up mode, the diagnostic unit also determines whether the solenoid valve setting existing at the moment in question is to be changed and then, if necessary, also performs the change.

DETAILED DESCRIPTION

Figure 1:
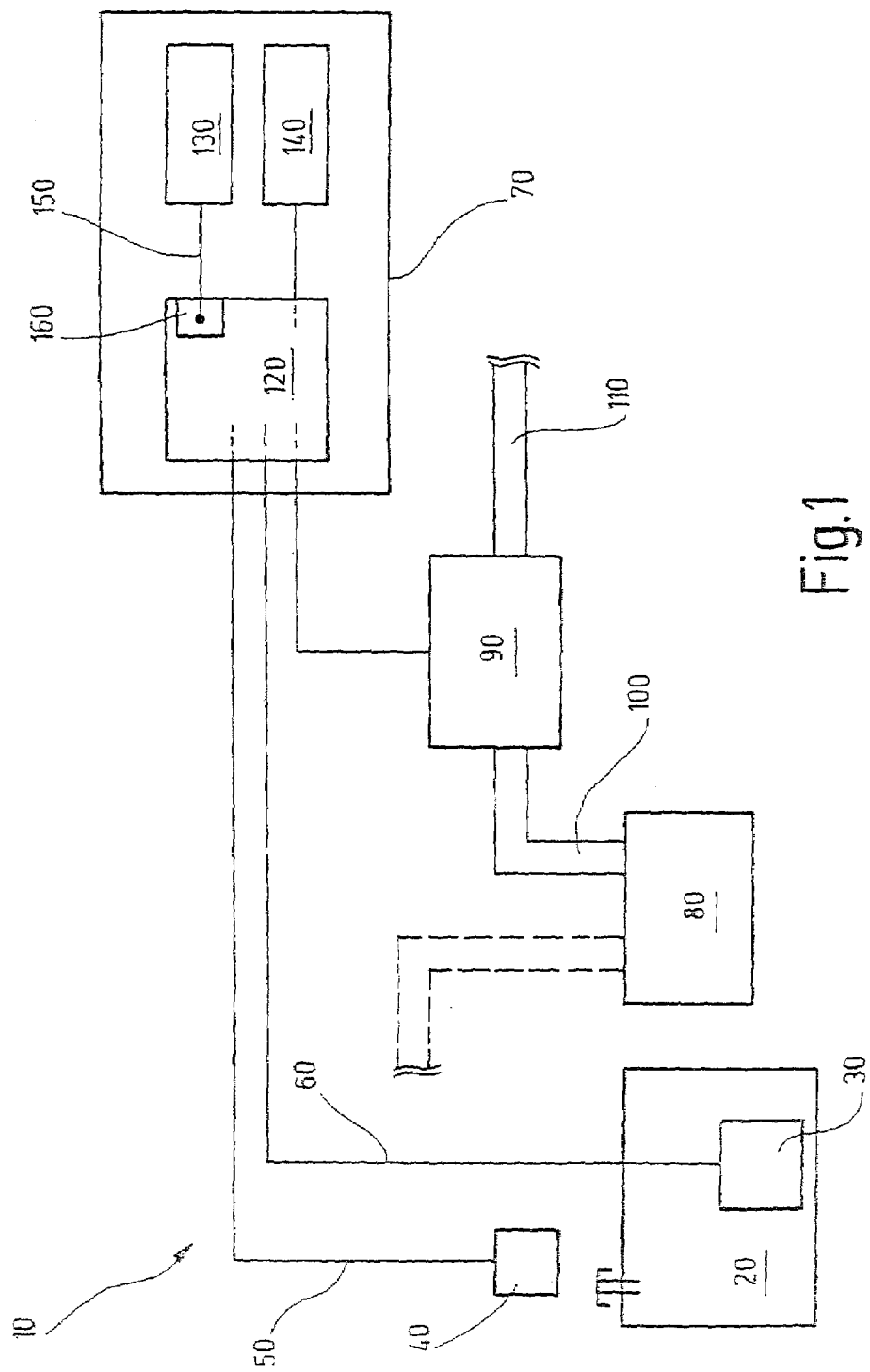
FIG. 1 illustrates a tank system including a diagnostic unit for performing the method according to the present invention.

Tank system 10 illustrated in FIG. 1, of an engine of a motor vehicle, includes a tank 20, inside of which a first pressure sensor 30 is provided for detecting the internal tank pressure and outside of which a second pressure sensor 40 is provided for detecting the ambient pressure. It is to be noted that, in addition to or instead of both pressure sensors 30, 40, temperature sensors, etc. may also be used in order to acquire the pressure data in tank 20 necessary for a tank leak diagnosis.

Both pressure sensors 30, 40 are connected via signal lines 50, 60 to a diagnostic unit 70 according to the present invention. Tank 20 includes a connection, which conducts pressure, to an activated carbon filter 80, which includes, among other things, a line 100 connected to a bistable solenoid valve 90. Solenoid valve 90 also includes an exhaust line 110, which leads to the environment. Solenoid valve 90 may be operated without current in the open position and in the closed position. Diagnostic unit 70 contains a processor module 120, a permanently powered timer 130, and a comparator (compare-register) 140, which has a negligible current consumption.

Following the shutoff of the engine, and provided that a diagnosis is required, diagnostic unit 70 loads compare-register 140 with a time-interval value, after which the next wake-up of diagnostic unit 70 and/or processor module 120 is to occur. When timer 130 has this value, which is entered in compare-register 140, timer 130 triggers the switching on of processor module 120 via a line 150, which, in the present example, is connected to a reset input 160 of processor module 120, whereupon diagnostic unit 170 performs the necessary actions for leak testing, i.e., loading and, if necessary, analyzing the internal tank pressure and the ambient pressure, for example.

After completion of these actions, compare-register 140 is reloaded with a time interval value, this value representing either a permanently selected value or a value which progressively increases, e.g., exponentially increases, upon each reloading of compare-register 140. Timer 130 is reset and restarted. Subsequently, diagnostic unit 70, i.e., processor module 120, if necessary, including pressure sensors 30, 40, is temporarily switched off and/or put into a sleep mode.

The procedure described is repeated until the diagnostics have ended. At the end of the diagnostics period, timer 130 is no longer started before the switch off, so that diagnostic unit 70 then remains permanently switched off in order to also save energy.

In the example embodiment, it is also provided that, after processor module 120 is switched on, diagnostic unit 70 also checks whether an overpressure exists in tank 20 according to the pressure data acquired. If this is the case, it is also checked whether the setting of solenoid valve 90 is "open," so that excess fuel vapor or fuel gas may be conducted to the outside via exhaust line 110. If the current setting is "closed," diagnostic unit 70 induces the solenoid valve setting to change to "open."

Figure 2:
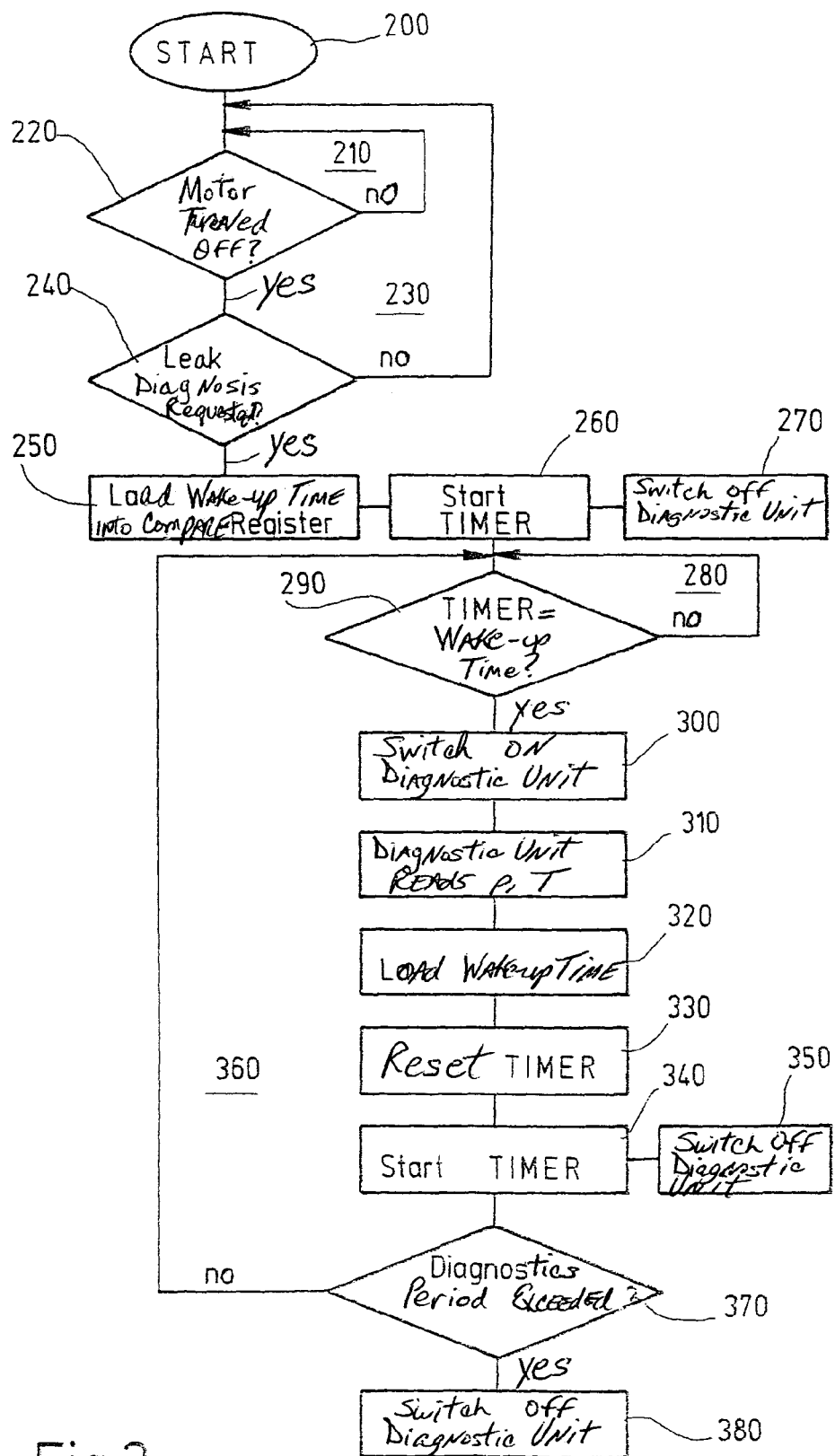
FIG. 2 illustrates an example embodiment of the method according to the present invention on the basis of a flow chart.

As an example embodiment of the method according to the present invention, FIG. 2 illustrates a program routine for the use in a diagnostic unit of a motor vehicle described in FIG. 1. After start 200 of the routine it is first checked 220, in a first program loop 210, whether the engine of the motor vehicle is turned off. If this is the case, it is checked 240, in a second program loop 230, whether a leak diagnosis, e.g., in accordance with a higher order maintenance program, has been requested. If not, the sequence jumps back to first loop 210. If there is such a request, a value of a wake-up time, e.g., 5 minutes, is loaded 250 into the compare-register. Subsequently, the timer is started 260 and the diagnostic unit is set into a sleep mode or switched off 270.

In a third program loop 280, it is checked 290 whether the current value of the timer is greater than or equal to the wake-up time. If this is the case, the diagnostic unit is set into a wake-up mode and/or switched on 300 and reads out 310 current sensor data for pressure and/or temperature. Subsequently, the compare register is reloaded 320, the timer is reset again 330, and the timer is restarted 340. Simultaneously, the diagnostic unit is switched off again 350.

Using a fourth program loop 360, the steps described above are repeated until the diagnostics have ended and/or the diagnostics period is reached 370. After the diagnostics period is exceeded, the diagnostic unit is permanently switched off 380.

The present invention may be used not only in tank systems of motor vehicles, but, in principle, in all tank systems of internal combustion engines in which leak testing is performed during rest operation.

What is claimed is:

1. A method of operating a diagnostic unit for leak testing of a tank system of an internal combustion engine, comprising:

acquiring measurement data necessary for leak testing during a diagnostics period after the internal combustion engine is turned off;

setting the diagnostic unit to a sleep mode for a preset first time interval after the internal combustion engine is turned off;

setting the diagnostic unit to a wake-up mode after the first time interval elapses, the diagnostic unit at least acquiring the measurement data in the wake-up mode;

setting the diagnostic unit to the sleep mode again during the diagnostics period; and switching off the diagnostic unit at an end of the diagnostics period.

2. The method of claim 1, wherein the internal combustion engine is arranged in a motor vehicle.

3. The method of claim 1, further comprising dynamically determining the diagnostics period as a function of an existence of a diagnostic result.

4. The method of claim 1, further comprising setting a length of the first time interval to progress over time.

5. The method of claim 4, wherein the length is set in the length setting step to increase exponentially.

6. The method of claim 1, wherein the diagnostic unit is set to the wake-up mode in the wake-up mode setting step within an at least second time interval and the diagnostic unit acquires at least the measurement data in the acquiring step within the at least second time interval.

7. The method of claim 1, wherein the tank system includes a switchover valve and a filter, the method further comprising:
  conducting an excess fuel gas to outside via the filter in a case of overpressure in the tank system;
  determining by the diagnostic unit set to the wake-up mode whether a setting of the switchover valve is to be changed; and
  if necessary, inducing the change by the diagnostic unit.

8. A device for operating a diagnostic unit for leak testing of a tank system of an internal combustion engine, comprising:
  a sensor system configured to acquire measurement data necessary for leak testing;
  an arrangement configured to detect a shutoff of the internal combustion engine;
  a timer arrangement configured to specify a first time interval; and
  a sleep/wake-up arrangement configured to set the diagnostic unit in a sleep mode, during which the diagnostic unit is turned off, and, at the end of the first time interval, in a wake-up mode, in which at least the measurement data is acquired.

9. The device of claim 8, wherein the internal combustion engine is arranged in a motor vehicle.

10. The device of claim 8, wherein the tank system includes a switchover valve and a filter configured to conduct excess fuel gas to outside via the filter in the case of overpressure in the tank system, and wherein the diagnostic unit includes a processor arrangement configured to determine whether a valve setting is to be changed and to induce a change in the valve setting if necessary.

11. A diagnostic unit for leak testing of a tank system of an internal combustion engine, comprising:
  a sleep operation mode and a wake-up operation mode, the diagnostic unit configured to perform a method including:
  acquiring measurement data necessary for leak testing during a diagnostics period after the internal combustion engine is turned off;
  setting the diagnostic unit to the sleep mode for a preset first time interval after the internal combustion engine is turned off;
  setting the diagnostic unit to the wake-up mode after the first time interval elapses, the diagnostic unit at least acquiring the measurement data in the wake-up mode;
  setting the diagnostic unit to the sleep mode again during the diagnostics period; and
  switching off the diagnostic unit at an end of the diagnostics period.

12. The diagnostic unit of claim 11, wherein the internal combustion engine is arranged in a motor vehicle.

13. The diagnostic unit of claim 11, wherein the method further includes dynamically determining the diagnostics period as a function of an existence of a diagnostic result.

14. The diagnostic unit of claim 11, wherein the method further includes setting a length of the first time interval to progress over time.

15. The diagnostic unit of claim 14, wherein the length is set in the length setting step to increase exponentially.

16. The diagnostic unit of claim 11, wherein the diagnostic unit is set to the wake-up mode in the wake-up mode setting step within an at least second time interval and the diagnostic unit acquires at least the measurement data in the acquiring step within the at least second time interval.

17. The diagnostic unit of claim 11, wherein the tank system includes a switchover valve and a filter, the method further including:
  conducting an excess fuel gas to outside via the filter in a case of overpressure in the tank system;
  determining by the diagnostic unit set to the wake-up mode whether a setting of the switchover valve is to be changed; and
  if necessary, inducing the change by the diagnostic unit.

18. The diagnostic unit of claim 11, further comprising:
  a timer arrangement configured to specify a first time interval; and
  an arrangement configured to make the switch from the sleep operation mode to the wake-up operation mode upon elapse of the first time interval.

19. The diagnostic unit of claim 18, further comprising at least one compare-register configured to record the first time interval.

20. The diagnostic unit of claim 11, further comprising a processor arrangement configured to determine whether a valve setting is to be changed, and to induce a change in the valve setting, if necessary, the tank system including a switchover valve and a filter configured to conduct excess fuel gas to the outside via the filter in a case of overpressure in the tank system.

* * * * *